United States Patent
Pulz et al.

(10) Patent No.: US 11,195,510 B2
(45) Date of Patent: *Dec. 7, 2021

(54) SYSTEM AND METHOD FOR INTELLIGENT LANGUAGE SWITCHING IN AUTOMATED TEXT-TO-SPEECH SYSTEMS

(71) Applicant: AT&T Intellectual Property I, L.P., Atlanta, GA (US)

(72) Inventors: Gregory Pulz, Cranbury, NJ (US); Harry E. Blanchard, Rumson, NJ (US); Lan Zhang, Malvern, PA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 111 days.

This patent is subject to a terminal disclaimer.

(21) Appl. No.: 16/542,795

(22) Filed: Aug. 16, 2019

(65) Prior Publication Data
US 2019/0371293 A1 Dec. 5, 2019

Related U.S. Application Data

(63) Continuation of application No. 15/583,068, filed on May 1, 2017, now Pat. No. 10,388,269, which is a
(Continued)

(51) Int. Cl.
*G06F 40/30* (2020.01)
*G06F 40/58* (2020.01)
(Continued)

(52) U.S. Cl.
CPC ............ *G10L 13/086* (2013.01); *G06F 40/58* (2020.01); *G10L 13/047* (2013.01)

(58) Field of Classification Search
CPC .. G06F 17/28; G06F 17/2809; G06F 17/2818; G06F 17/2827; G06F 17/2836;
(Continued)

(56) References Cited

U.S. PATENT DOCUMENTS 5,636,325 A * 6/1997 Farrett .................... G10L 13/10
704/231
5,835,854 A * 11/1998 Palisson ................. G08G 1/094
455/186.1
(Continued)

OTHER PUBLICATIONS

"Multilingual Text-to-Speech Synthesis: The Bell Labs Approach," Computational Linguistics, vol. 24, No. 4, 1998, pp. 656-658.
(Continued)

*Primary Examiner* — Lamont M Spooner

(57) ABSTRACT

Systems, methods, and computer-readable storage media for providing for intelligent switching of languages and/or pronunciations in a text-to-speech system. As the system receives text, the text is analyzed to identify portions which should have speech constructed using a pronunciation distinct from the remaining portions of the text. The text-to-speech system uses multiple pronunciation dictionaries to generate and produce speech corresponding to the text, where the identified portions of the text are in a different language or have a different accent from the remainder of the text. Having generated speech corresponding to the text in multiple languages, accents, or dialects, the system combines the portions, then communicates the speech to the text recipient.

20 Claims, 5 Drawing Sheets

Related U.S. Application Data continuation of application No. 14/022,991, filed on Sep. 10, 2013, now Pat. No. 9,640,173.

(51) Int. Cl.
 *G10L 13/047* (2013.01)
 *G10L 13/08* (2013.01)

(58) Field of Classification Search
 CPC .............. G06F 17/2845; G06F 17/2854; G06F 17/2863; G06F 17/2872; G06F 17/289; G06F 17/2881; G06F 40/211; G06F 40/253; G06F 40/268; G06F 40/284; G06F 40/30
 USPC ........................................................ 704/1–10
 See application file for complete search history.

(56) References Cited

U.S. PATENT DOCUMENTS

| | | | |
|---|---|---|---|
| 6,115,686 A * | 9/2000 | Chung ................... G10L 13/08 | 704/260 |
| 6,141,642 A | 10/2000 | Oh | |
| 6,240,392 B1 * | 5/2001 | Butnaru ............... G09B 21/009 | 704/271 |
| 6,487,531 B1 * | 11/2002 | Tosaya .................... G10L 15/20 | 704/223 |
| 6,813,597 B1 * | 11/2004 | Demler ................. G06F 30/367 | 703/14 |
| 7,082,395 B2 * | 7/2006 | Tosaya .................... G10L 15/20 | 704/246 |
| 7,191,132 B2 | 3/2007 | Brittan et al. | |
| 7,272,377 B2 | 9/2007 | Cox et al. | |
| 7,406,414 B2 | 7/2008 | Creamer et al. | |
| 7,546,382 B2 | 6/2009 | Healey et al. | |
| 7,555,433 B2 | 6/2009 | Otani | |
| 7,596,499 B2 | 9/2009 | Anguera Miro et al. | |
| 7,873,517 B2 | 1/2011 | Prieto et al. | |
| 8,019,591 B2 | 9/2011 | Gao et al. | |
| 8,041,555 B2 | 10/2011 | Buccella | |
| 8,126,703 B2 | 2/2012 | Runge et al. | |
| 8,346,563 B1 | 1/2013 | Hjelm et al. | |
| 8,374,791 B2 | 2/2013 | Holsinger | |
| 8,468,010 B2 | 6/2013 | Chaturvedi et al. | |
| 8,631,122 B2 * | 1/2014 | Kadam ................... G06Q 10/10 | 709/224 |
| 9,798,653 B1 * | 10/2017 | Shao ........................ G10L 13/00 | |
| 2002/0184027 A1 * | 12/2002 | Brittan .................. G10L 13/047 | 704/258 |
| 2002/0184029 A1 * | 12/2002 | Brittan ................... G10L 13/08 | 704/260 |
| 2002/0184030 A1 * | 12/2002 | Brittan ................... G10L 13/08 | 704/260 |
| 2002/0184031 A1 * | 12/2002 | Brittan ................... G10L 15/22 | 704/260 |
| 2003/0061050 A1 * | 3/2003 | Tosaya .................... G10L 19/08 | 704/261 |
| 2003/0191643 A1 * | 10/2003 | Belenger ............... G10L 15/005 | 704/254 |
| 2004/0133416 A1 * | 7/2004 | Fukuoka ............. G06F 16/9566 | 704/3 |
| 2006/0200355 A1 | 9/2006 | Sideman | |
| 2007/0011132 A1 * | 1/2007 | Zhou ..................... G06F 16/951 | |
| 2008/0010355 A1 * | 1/2008 | Vieri .................... H04M 3/5322 | 709/206 |
| 2008/0015860 A1 * | 1/2008 | Lane ..................... G10L 13/047 | 704/258 |
| 2008/0071518 A1 * | 3/2008 | Narayanan .............. G06F 40/58 | 704/2 |
| 2008/0140422 A1 * | 6/2008 | Hovestadt ............... G10L 15/26 | 704/275 |
| 2008/0208593 A1 | 8/2008 | Ativanichayaphong et al. | |
| 2009/0048821 A1 | 2/2009 | Yam et al. | |
| 2009/0055162 A1 * | 2/2009 | Qian ....................... G10L 13/06 | 704/8 |
| 2009/0204402 A1 * | 8/2009 | Marwaha ................. G10L 13/08 | 704/260 |
| 2009/0299724 A1 | 12/2009 | Deng et al. | |
| 2010/0017193 A1 * | 1/2010 | Runge ..................... G06F 40/58 | 704/8 |
| 2010/0082345 A1 * | 4/2010 | Wang .................... G06T 13/205 | 704/260 |
| 2010/0256972 A1 * | 10/2010 | Grenier ................... G06F 40/58 | 704/2 |
| 2010/0265397 A1 * | 10/2010 | Dasher ........... H04N 21/234336 | 348/468 |
| 2011/0054880 A1 | 3/2011 | Fleizach | |
| 2011/0218804 A1 * | 9/2011 | Chun .................... G10L 15/144 | 704/243 |
| 2011/0218806 A1 * | 9/2011 | Alewine ................ G10L 15/187 | 704/251 |
| 2011/0238407 A1 * | 9/2011 | Kent ....................... G06F 40/58 | 704/3 |
| 2012/0004841 A1 | 1/2012 | Schunder | |
| 2012/0173241 A1 * | 7/2012 | Li .......................... G10L 13/10 | 704/260 |
| 2012/0253781 A1 * | 10/2012 | Qian ..................... G10L 21/003 | 704/2 |
| 2012/0265518 A1 * | 10/2012 | Lauder ................... G06F 40/51 | 704/3 |
| 2013/0030789 A1 * | 1/2013 | Dalce .................... G10L 15/005 | 704/2 |
| 2013/0132069 A1 * | 5/2013 | Wouters .................. G10L 13/06 | 704/8 |
| 2013/0211818 A1 * | 8/2013 | Sakamoto ............... G10L 13/033 | 704/2 |
| 2013/0238339 A1 * | 9/2013 | Fleizach ................ G06F 40/263 | 704/260 |
| 2013/0289971 A1 * | 10/2013 | Parkinson ............... G06F 40/58 | 704/2 |
| 2014/0204014 A1 * | 7/2014 | Thorn ...................... H04W 4/18 | 345/156 |
| 2014/0337007 A1 * | 11/2014 | Waibel .................... G10L 13/02 | 704/3 |
| 2014/0358516 A1 * | 12/2014 | Lin ........................ G06F 40/58 | 704/2 |
| 2017/0148436 A1 * | 5/2017 | Sugiura .................. G10L 15/14 | |

OTHER PUBLICATIONS

Taylor, P., "Text to Speech Synthesis," Cambridge University Press, Cambridge, UK, 2009. BOOK.

Moberg, M., "Contributions to Multilingual Low-Footprint TTS System for Hand-Held Devices," Doctoral Thesis, Aug. 17, 2007, Tampere University of Technology, 82 pages.

Pucher et al., "Regionalized Text-to-Speech Systems: Persona Design and Application Scenarios," In: COST action 2102 school, Vietri sul Mare, Italy, Lecture notes in artificial intelligence (LNAI), vol. 5398, pp. 216-222, 2009.

\* cited by examiner

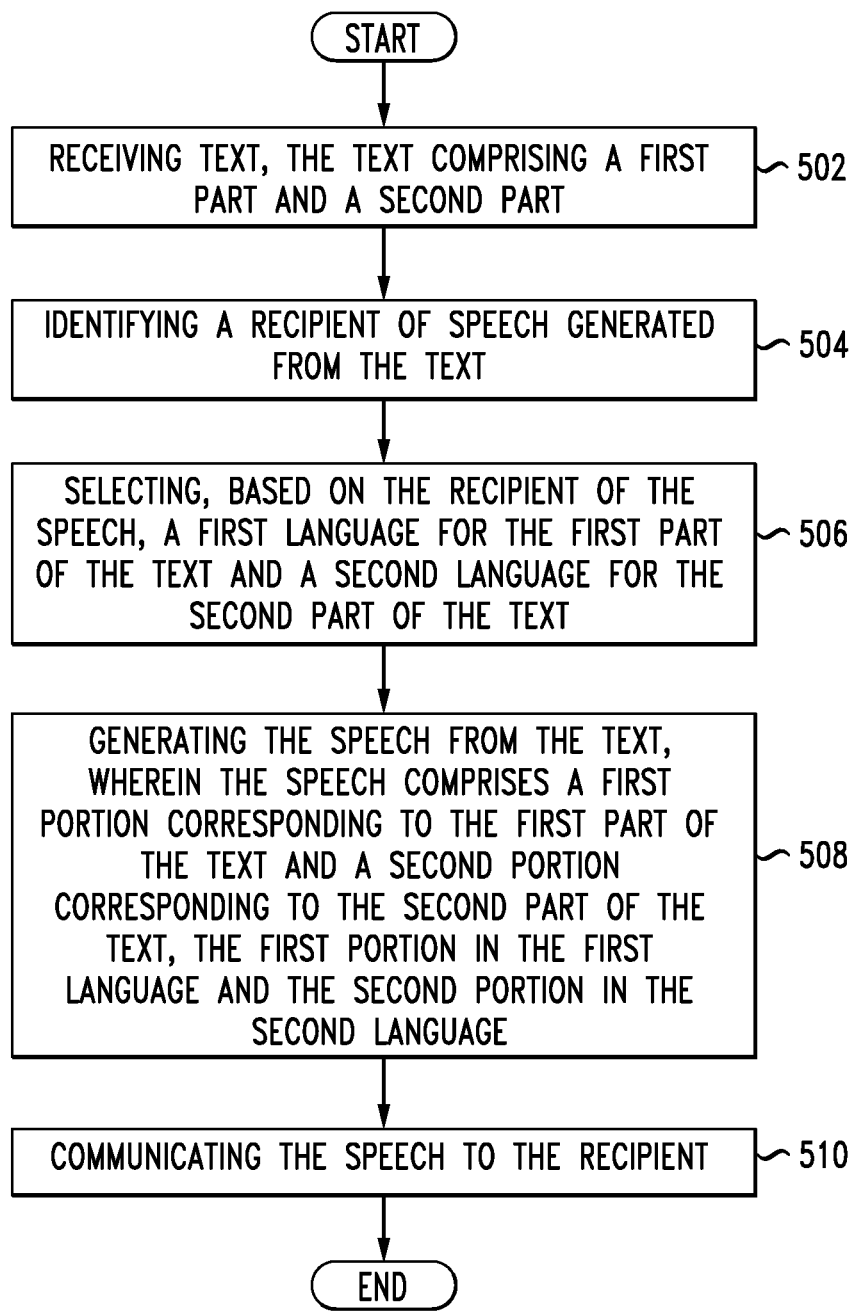

SYSTEM AND METHOD FOR INTELLIGENT LANGUAGE SWITCHING IN AUTOMATED TEXT-TO-SPEECH SYSTEMS

PRIORITY INFORMATION

The present application is a continuation of U.S. patent application Ser. No. 15/583,068, filed May 1, 2017, which is a continuation of U.S. patent application Ser. No. 14/022,991, filed Sep. 10, 2013, now U.S. Pat. No. 9,640,173, issued May 2, 2017, the contents of which are incorporated herein by reference in their entirety.

BACKGROUND

1. Technical Field

The present disclosure relates to intelligent switching of languages in a text-to-speech system, and more specifically to switching languages based on specific circumstances and needs of the speech recipient.

2. Introduction

Text-to-speech systems convert text into speech by looking up phrases, words, or phonemes from language-specific databases based on user settings. For example, a text-to-speech system for an English speaker first identifies English sounds which correspond to text using a database of English words, then combines the identified sounds into a speech output in English. Similarly, a text-to-speech system for a Spanish speaker identifies Spanish sounds corresponding to text, then combines the sounds into a speech output in Spanish. Certain multi-lingual text-to-speech systems operate by identifying foreign language words within text, then searching for pronunciations of those foreign language words in a database separate from the "standard" language for the remainder of the text. Similar text-to-speech systems can be used for domain-specific topics, where the text-to-speech system searches the text for domain-specific words which are found in a domain-specific database.

BRIEF DESCRIPTION OF THE DRAWINGS

FIG. 5 illustrates an example method embodiment.

DETAILED DESCRIPTION

Figure 1:
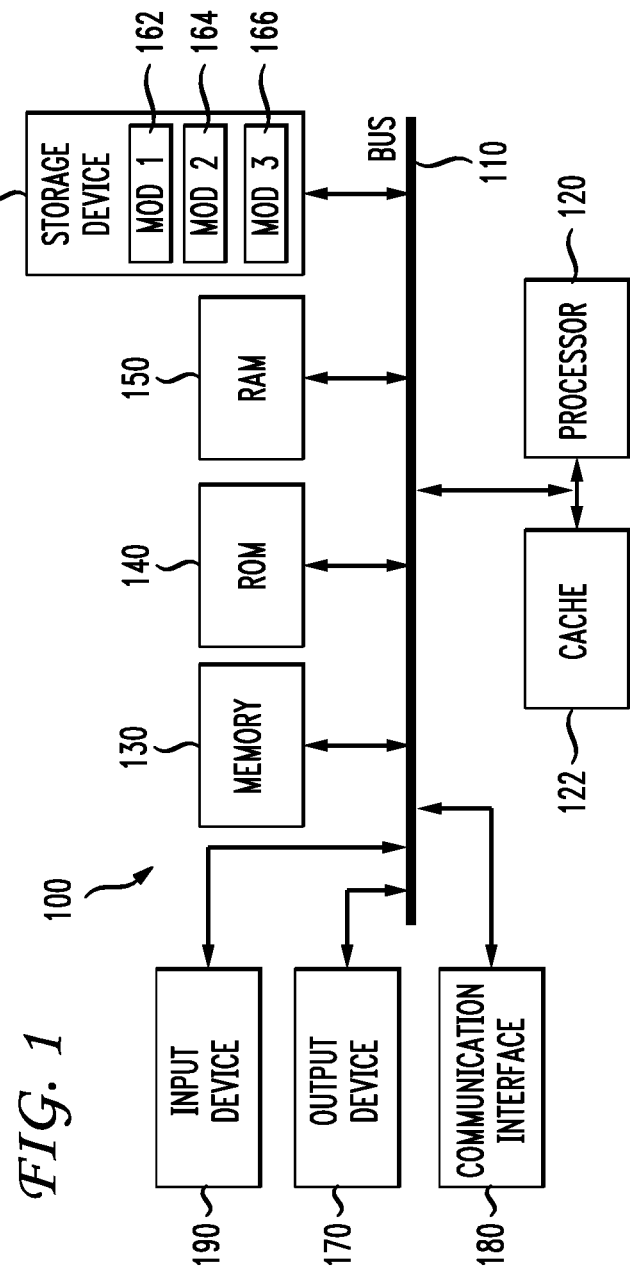
FIG. 1 illustrates an example system embodiment.

A system, method and computer-readable media are disclosed which provide for intelligent switching of languages and/or pronunciations in a text-to-speech system. As the system receives text, the text is analyzed to identify portions which should have speech constructed using a source distinct from the remaining portions of the text. For example, if a native Spanish speaker were navigating a city in Maine, the bulk of the speech output could be in Spanish, but the street names could be output in English, thereby allowing the Spanish speaker to understand the majority of the speech while hearing the name of the street which will actually appear on street signs. As another example, the system can recognize names and proper nouns as having a pre-set pronunciation belonging to a particular language. For example, proper names for places, individuals, brands, or products may be in a specific language, even if a translation is available. Consider the pronunciation of "17" in "17 Spring Meadow Road." The system, if producing a pronunciation for a Spanish speaker, would produce the speech as "Diecisiete Spring Meadow Road," whereas in English the pronunciation would be "Seventeen Spring Meadow Road." In addition, the system can be aware of words which, when pronounced, sound similar to a word in another language, thereby necessitating pronunciation in a particular language to avoid confusion. For example, "Main" is pronounced like the English word "mine" in German, thus an address with "Main" in it ("Frankfurt am Main") must be pronounced one way or the other depending upon context and circumstance. In such circumstances, which way the similar sounding word is pronounced can be determined based on what language other words, within a threshold distance of the similar sounding word, are being pronounced. Alternatively, the language can be predetermined by user preferences and/or location of the user.

The system can also adapt text-to-speech output for specific geographic regions. Such configurations can aide users to hear the regional dialects for words or can provide a more natural listening experience for the user. For example, a Texan might be more comfortable hearing a pronunciation of "fixin" than "fixing." In such scenarios, the system can access a database of Texas accents. Geographic adaption can be specified by the user, or can be automatically determined using the standard language of the user in conjunction with a current location of the user. Alternatively, the geographic based pronunciation adaption can occur based on a nationality or home of the user. The current location of the user can be determined using a GPS (Global Positioning System), triangulation via phone towers, IP address, or other methods for determining a user location. Often, a user's mobile device, such as a smartphone, tablet, or laptop, can determine the user's current location.

Users can configure which portions of text have alternative pronunciations, such as languages or accents. For example, a user can manually configure which portions of text (including names, addresses, numbers, etc.) the system pronounces differently than the majority of the text. Alternatively, users can select various models and pronunciation schemes which can determine which words the system pronounces distinctly from the remaining words. Various user specified or automatic configurations can automatically configure which portions of the text have distinct pronunciations based on current user location, word pronunciations by friends/acquaintances, word pronunciation by the user, trending pronunciation changes by the population at large, the age, race, sex, and/or other demographics of a sender and/or recipient of the text, as well as a time of the speech to text conversion. A combination of manual and automatic pronunciation specification can also be utilized, where the user identifies specific portions which, when encountered, will produce spoken pronunciation in a distinct language from the remainder text, while an automatic model determines other portions of the text which are presented in the distinct language.

Identification, in real-time, of the various portions of the text for alternative pronunciations is performed via a natural language analysis, and without an analysis of tags in the speech. Whereas other systems process the text, tag specific text portions, and modify pronunciations based on the tagged portions, the disclosed system uses no tags. Instead, as the system receives text the text is subject to pre-processing modules or a processor performing a natural language analysis. Exemplary pre-processing modules/software includes a text analysis module/application and a rule book. The rule book monitors the text input to the text-tospeech system. For example, as the text is being input to the system as a stream of text, the rule book monitors the stream of text. The rule book can operate in addition or in place of the text analysis, and it may both utilize the results of text analysis and/or apply the rule book rules independently of the text analysis. For instance, stored text may have markers (e.g., text field identifiers in a form) which indicate things like "Address" or "Name" as opposed to "this text segment is a set of landmarks for direction." The rule book designates a mapping from category to voice (or language) the system uses to create pronunciations. The rules in the rule book, therefore, can be based on explicit markers in the text and/or mapped to output from the text analysis.

The output of the text analysis and/or rule book is a command to switch from the current voice to one of the stored alternatives or to switch the entire text-to-speech system to another language. The various stored voices with various marked qualities, such as gender, age, accent, speed, and attitude, which the system can use when selecting how the text is pronounced. The pre-processing runs in parallel with the normal processing needed for text-to-speech systems, and the pre-processing output can link with the on-going text-to-speech stream. Based upon the pre-processing, the system sends a command to the on-going text-to-speech process to switch voice/language/accent processing at a designated future point in the text.

The text analysis may take one or more alternative (or simultaneous) forms of text processing. A speech recognition module may, for example, be set to identify incoming text streams as an address, a set of landmarks, directions, a word associated with a specific age/ethnic group, proper names of individuals, items, and/or locations such as restaurants, streets, or buildings. A language identifier can identify a segment, or portion, of the incoming text as belonging to a certain language different from preceding text by comparing the text to a list of categories, thereby marking blocks of text as belonging to an alternative language/pronunciation. For example, a news stream may transition from a first anchor person to a reporter, to a weather report, to a piece on current fashion, etc. A text-to-speech conversion of the news stream transcript, using the disclosed system, can convert between various pronunciations for each anchor, reporter, or context on the fly based on fields within the transcript. Alternatively, the text-to-speech system, when converting a transcript, can switch between pronunciations based on the context by analyzing specific words within the text.

Various embodiments of the disclosure are described in detail below. While specific implementations are described, it should be understood this is done for illustration purposes only. Other components and configurations may be used without parting from the spirit and scope of the disclosure. A brief introductory description of a basic general purpose system or computing device in FIG. 1 which can be employed to practice the concepts, methods, and techniques disclosed is illustrated. A more detailed description of intelligent language switching in automated text-to-speech systems, with accompanying variations, will then follow. These variations shall be described herein as the various embodiments are set forth.

With reference to FIG. 1, an exemplary system and/or computing device 100 includes a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the processor. The processor 120 may be a self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive, and other non-transitory media. The storage device 160 can include software modules 162, 164, 166 for controlling the processor 120. The system 100 can include other hardware or software modules. The storage device 160 is connected to the system bus 110 by a drive interface. The drives and the associated computer-readable storage media provide non-volatile storage of computer-readable instructions, data structures, program modules and other data for the computing device 100. In one aspect, a hardware module that performs a particular function includes the software component stored in a tangible computer-readable storage medium in connection with the necessary hardware components, such as the processor 120, bus 110, display 170, and so forth, to carry out a particular function. In another aspect, the system can use a processor and computer-readable storage medium to store instructions which, when executed by the processor, cause the processor to perform a method or other specific actions. The basic components and appropriate variations can be modified depending on the type of device, such as whether the device 100 is a small, handheld computing device, a desktop computer, or a computer server.

Although the exemplary embodiment(s) described herein employs the hard disk 160, other types of computer-readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Tangible computer-readable storage media, and a computer-readable storage device, expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic hardware depicted may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations described below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored in other computer-readable memory locations.

Figure 2:
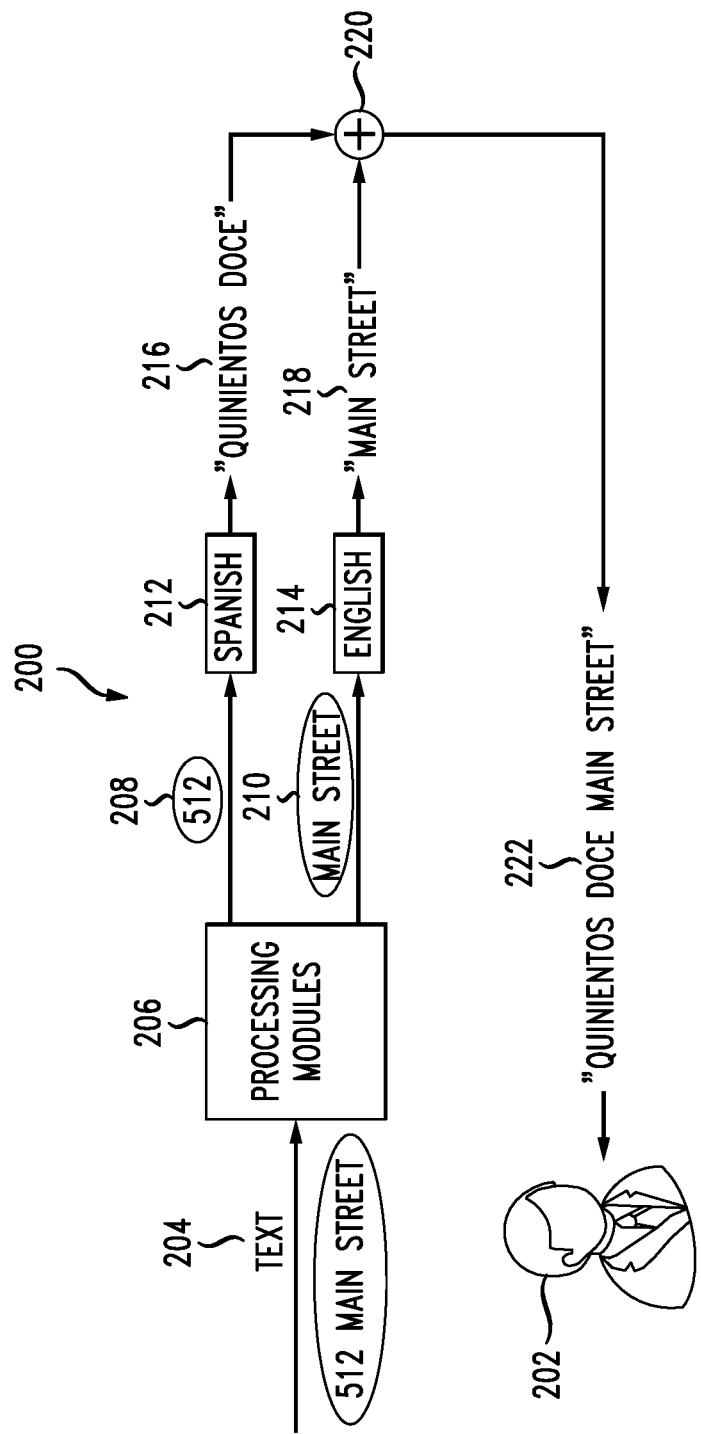
FIG. 2 illustrates a system used to present text bilingually.

Having disclosed some components of a computing system, the disclosure now turns to FIG. 2, which illustrates a system 200 used to present text bilingually. Text 204 is received which is intended for presentation as speech 222 to a recipient 202. The text 204 in the example is "512 Main Street." The illustrated recipient, however, is a Spanish speaker, and feels more comfortable with Spanish than English. However, despite the recipient's relative discomfort with English, the street signs for the recipient's current city are in English.

The system 200, upon receiving the text 204, begins processing 206 the text. The processing 206 can be performed by one or more processors or dedicated text analysis modules. The analyses performed by the processors/processing modules 206 can include comparing the text to a predetermined rule book and performing a text analysis of the incoming text 204. In certain configurations, only one of the rule book and text analysis is used, whereas in other configurations both the rule book and text analysis are used, either simultaneously or in sequence.

A text analysis compares each portion of the incoming text (such as a phrase, a word, a number, or a sentence) received to a list of predefined words or conditions which trigger an alternative language or pronunciation. For example, if a received text is the name of an individual, the system 200 can be set to pronounce the word in the recipient's native language. Likewise, landmarks, companies, brand names, nicknames, proper-nouns, and other user-specified words and phrases can be identified by the text analysis and sent to an alternative pronunciation.

A rule book analysis can use markers found in the text stream (e.g., text field identifiers in a form) which indicate things like "Address" or "Name." The text field identifiers are not tags, but are actually part of the text stream, such as "Name: Albert." When the system 200 detects the categories, a rule book analysis designates a mapping from category to voice or language for speech processing. The rules in the rule book, therefore, can be based on explicit markers in the text and/or mapped to output from, or in conjunction with, the text analysis.

As illustrated in FIG. 2, the processing modules 206 have determined that the text received has two portions corresponding to an address—"512" 208 and "Main Street" 210. Because the recipient 202 prefers Spanish, the number portion 508 is converted to speech using a Spanish language pronunciation dictionary 212. However the street name, "Main Street" 210, will not be converted to another language during conversion to speech. Reasons for keeping "Main Street" in English can include a current location of the recipient 202, a preference of the recipient, a template selected by the recipient, languages/pronunciations friends of the recipient are using, languages/pronunciations of the recipient themselves, etc.

The system 200 produces speech corresponding to the respective text portions in the respective languages. Therefore, the text corresponding to the number "512" 208 is converted, using a Spanish pronunciation dictionary 212, to spoken speech "Quinientos doce" 216. The configuration can require a translation table for language translations, or looking up corresponding pronunciations for other accents and pronunciations. The system 200 also produces English speech corresponding to "Main Street" 218. The alternative language (Spanish) pronunciation and the primary language (English) pronunciation can occur simultaneously, or can be produced in turns. The timing of the speech production can depend on the type of analysis performed. For example, if a rule book is used to process 206 text, larger segments of text may be recognized before conversion of the text to speech, allowing for buffering and iterative text-to-speech conversion. Alternatively, smaller segments can be identified by the processing modules 206 and the speech production can occur for multiple portions of text simultaneously.

Upon generating audible speech portions 216, 218 respectively corresponding to the portions of text 208, 210 identified, the system 200 combines 220 the speech portions to form speech 222 corresponding to the original text 204. The combined speech 222 then has a portion in a foreign language or a pronunciation which differs from the recipient's 202 standard speech. In our example, the combined speech 222 is "Quinientos doce Main Street." The recipient 202 hears the street number in a language in which he is comfortable, while also hearing the street sign in the same language which will appear on the street signs.

Figure 3:
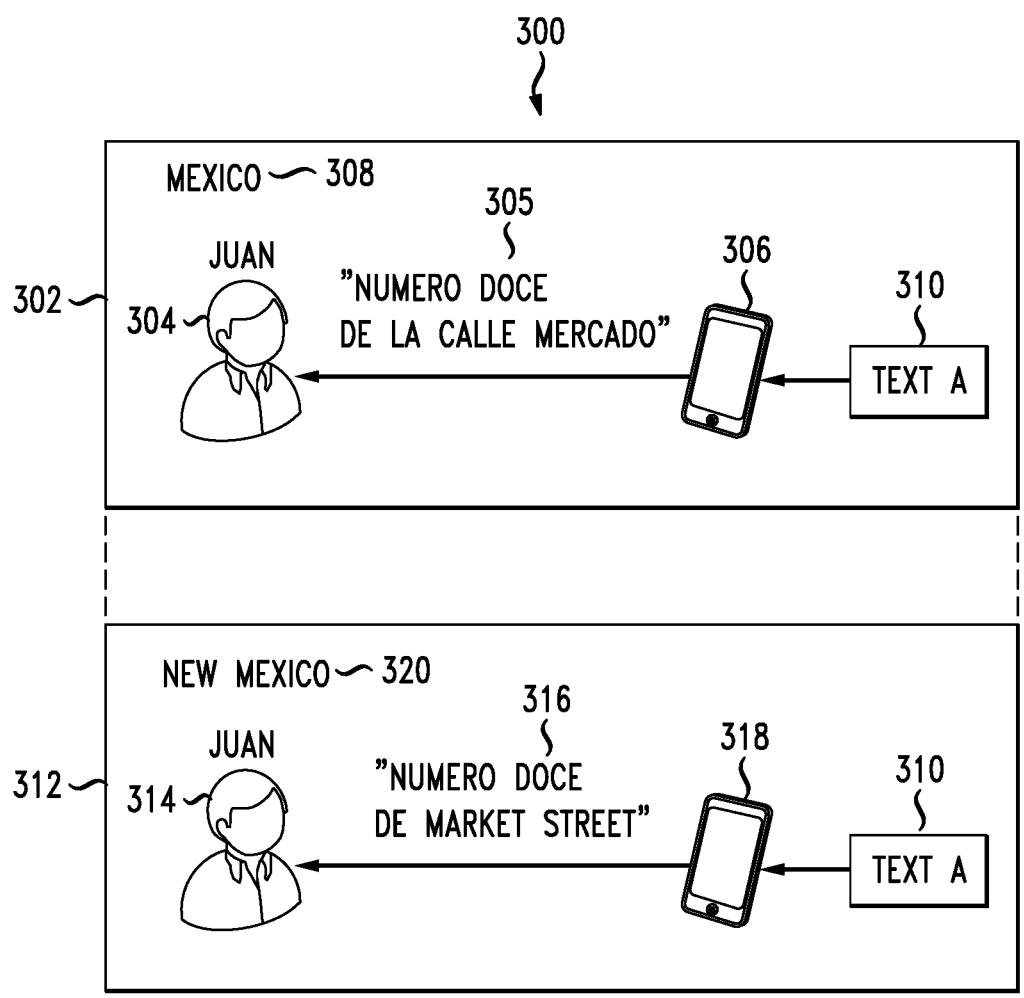
FIG. 3 illustrates an example of speech being modified based on a user's location.

FIG. 3 illustrates an example of speech being modified based on a user's location. In this example 300, the same text message 310 is being converted from text into speech, for an identical recipient, at two separate locations: Mexico 308 and New Mexico 320. In Mexico 302, the system receives the text message 310 at a smartphone 306, which performs the analyses to determine which portions of the text should be produced with one or more pronunciation dictionaries. The smartphone 306 knows that Juan 304 is a native Spanish speaker, and that Juan is currently located in Mexico 308. The smartphone 306 can be made aware of the preference for Spanish based on a user setting, or because the language the user most often communicates in is Spanish. The user's location can be identified by the smartphone 306 using GPS coordinates, IP addresses, cellular tower triangulation, or user command. Because the smartphone 306 has identified Juan 304 as a native Spanish speaker in Mexico 308, the smartphone 306 produces speech 305 corresponding to the text message 310 in all Spanish.

However, when the same native Spanish speaker 314 is found in New Mexico 312, and the smartphone 318 receives the same text message 310, the smartphone 318 determines that the number portion of the address should be presented in Spanish and the street name portion in English, resulting in speech 316 having a first portion in Spanish and a second portion in English. While the present example 300 illustrates multiple languages, the disclosed system can also provide pronunciations which are accent specific. If, for example, Juan 314 prefers a Mexican Spanish accent over a Cuban Spanish accent, only the pronunciation dictionary selected need vary. Similarly, pronunciations may vary depending on the age, ethnicity, or other social demographics of the user. For example, if a youth sends a text message containing "YOLO" to an adult, the adult may hear "You only live once" instead of a spoken "YOLO," whereas another youth receiving the message might hear "YOLO." The smartphone 318 (or other device capable of performing the disclosed steps) can be configured by the user to partition the incoming text into portions for one of the demographics, and/or can determine that such partitioning should be done automatically based on speech received from the text recipient, friends, family, or others within the social circle of the recipient.

Figure 4:
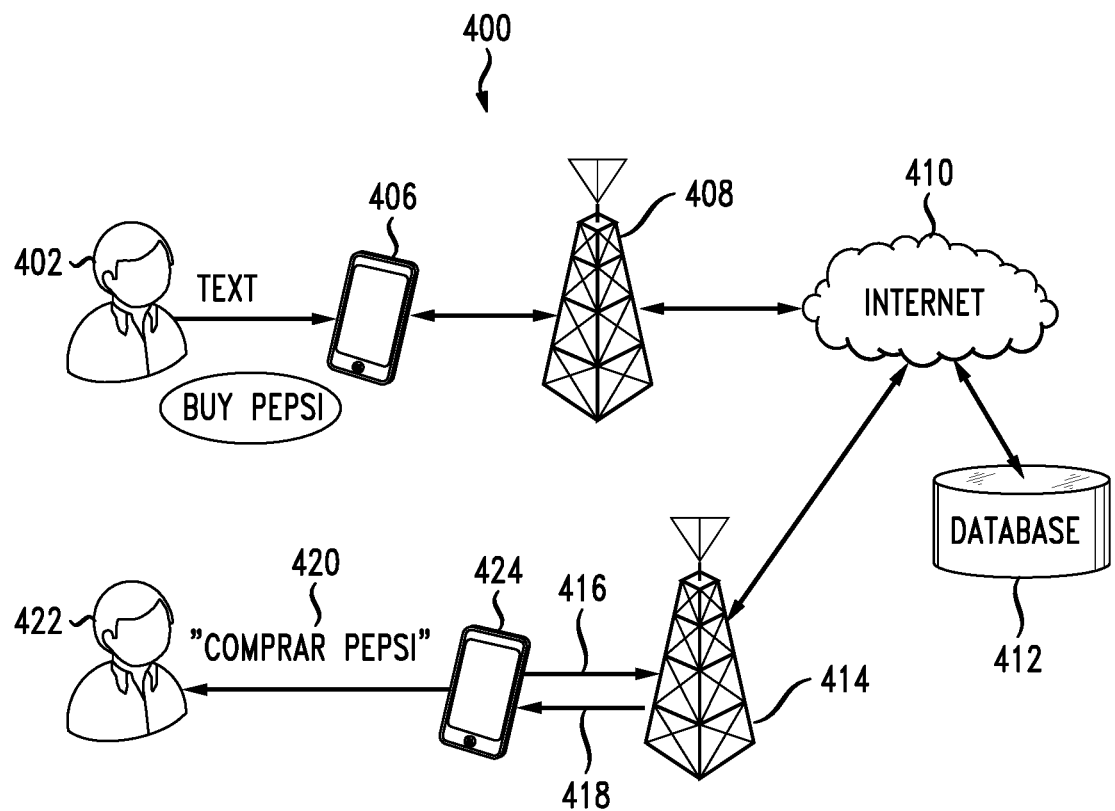
FIG. 4 illustrates a network configuration.

FIG. 4 illustrates a network configuration 400. A sender 402 sends a text message, such as "Buy Pepsi," using a phone 406, smartphone, or other communication device. The phone 406 relays the text message to radio tower 408 or other access point, where it can enter a network 410 such as the Internet or the publically switched telephone network. A tower 414 near the recipient receives the text message from the network 410, where it is communicated 418 to a second phone 424 belonging to the text message recipient 422.

In one configuration, the recipient's phone 424 processes the text message, identifying portions which should have a pronunciation corresponding to a first language and other portions which should have a pronunciation in a second language, generating the mixed language speech 420 from the identified portions, and outputting the mixed language speech 420 to the recipient 422. In other configurations, the processing of the text message occurs on a server or a computer connected to the network 410. In such configurations, the recipient's phone 424 can communicate 416 to the processing server specific pronunciation preferences of the recipient, or the processing computer can have a user profile saved which details preferences of the recipient.

In various configurations, a language, accent, or other varied pronunciation desired may be found in a pronunciation dictionary not stored on the recipient's smartphone 424. In such circumstances a database 412 can be accessed through the Internet 410, the database 412 storing the desired pronunciation dictionary. If the processing of the text message is being performed by a remote server over the Internet 410, the server can initiate a lookup of the desired speech components from the database 412, such that the recipient's smartphone 424 only receives the mixed language speech, and not the original text message.

Having disclosed some basic system components and concepts, the disclosure now turns to the exemplary method embodiment shown in FIG. 5. For the sake of clarity, the method is described in terms of an exemplary system 100 as shown in FIG. 1 configured to practice the method. The steps outlined herein are exemplary and can be implemented in any combination thereof, including combinations that exclude, add, or modify certain steps.

The system 100 receives text, the text comprising a first part and a second part (502). By way of example, the first part can be a number portion of an address and the second part can be a street name of the address. Another example is the first part being common words in the text and the second part being proper nouns, such as names, brand names, landmarks/locations. The system 100 then identifies a recipient of speech generated from the text (504). Often, the recipient is identified based on ownership of a phone, tablet, laptop, or other computing device. In many embodiments, the recipient is identified by a destination identification, such as a phone number, email address, IP (Internet Protocol) address, network address, or other means for identifying an individual recipient. Certain configurations can require a username and/or password to determine the identity of the recipient.

The system 100 selects, based on the recipient of the speech, a first language for the first part of the text and a second language for the second part of the text (506). The first and second language can also be based on the language of the sender, an original language of the text, a geographic location of the recipient, and the age, gender, ethnicity, or demographics of either the sender and/or recipient. The first and second languages can be more than just languages, such as Spanish and English. The first and second languages can also be accents based on age, location, gender, ethnicity, or any other demographic resulting in varied pronunciations. For example, the system 100 can determine that a recipient prefers a New York City pronunciation of certain words or phrases, and use a corresponding New York City pronunciation dictionary in place of a non-geographic specific English pronunciation dictionary. In various configurations, the system can blend both languages and accents. For example, the two languages selected can be New York City English and Madrid, Spain Spanish. A New York City/Madrid accent would sound very distinct than a West Texas English and Mexico City Spanish accent. Which languages and/or accents are selected can be based on which language pronunciation dictionaries are located in a database. The database of pronunciation dictionaries can be located within the system 100, such as when the pronunciation dictionaries are stored in memory on a smartphone or tablet, or the database can be located remotely on a computer/server accessed via a network such as the Internet.

Selection of the first language and the second language based on the recipient can be a direct result of user input, or can be based on automatic determination. As an example of a user directing the selection, a recipient might decide anytime a text is received from someone over 60 years old, regular text is pronounced using a pronunciation dictionary belonging to Yoda from Star Wars, while landmarks are pronounced using Darth Vader's pronunciation dictionary. The recipient can also identify which portions of received text have the alternative pronunciations, language preferences, speech rate preferences, and other options. The preferences and parameters can be saved in a user profile and used repeatedly. When selection is performed automatically, the selection can be based on speech patterns of the speech recipient, speech patterns of the sender of the text, speech patterns of friends or family, the age, sex, gender, and/or ethnicity of either the sender or recipient. The system 100 can use this information and determine a probability indicating a certain portion of the text should be communicated in the second language or with the alternative pronunciation. For example, the system 100 may be using a multi-language template which identifies portions for multi-language synthesis based on both a current location of the recipient as well as speech recorded by the recipient. Using the template, a probability is determined indicating the recipient probably wants the portions in particular languages and/or accents. If the probability were below a threshold, the corresponding part of the text would remain in the default language. In another example, the system 100 automatically determines the second language based on the native language of the sender of the message, while in yet another example the system automatically selects the second language based on a time of day the text is received and/or sent.

The system 100 generates the speech from the text, wherein the speech comprises a first portion corresponding to the first part of the text and a second portion corresponding to the second part of the text, the first portion in the first language and the second portion in the second language (508). One way the system can do this is matching pronunciations found in pronunciation dictionaries corresponding to the first and second languages to the respective portions of the text. This matching can occur on a phone, diphone, triphone, word, phrase, sentence, or paragraph basis. For example, in certain pronunciation dictionaries the matching can be done by entire words, resulting in speech for an entire word being returned from the pronunciation dictionary. In other pronunciation dictionaries, the matching can be done by phoneme, with the system 100 linking the speech portions (phonemes) in the correct order as the desired speech. The system 100, upon generating the speech, communicates the speech to the recipient (510).

The operations recited in the disclosed method can, based on specific configurations, be performed in an order other than the order presented. For example, selection, based on the recipient of the speech, of a first language for the first part of the text and a second language for the second part of the text (506) could be performed prior to the "receiving" operation. Moreover, while the illustrations and many of the examples disclosed herein discuss a first part and a second part, the system 100 can switch back and forth between languages as often as needed. That is, there can be more than two parts within a given text. Additional parts can be in the first language, the second language, or additional languages. For instance, if there are many parts identified in a text, every other word in a text message might be pronounced in a different language. How often the system 100 switches between languages is entirely dependent on how to convey the appropriate information to the user.

Embodiments within the scope of the present disclosure may also include tangible and/or non-transitory computer-readable storage media for carrying or having computer-executable instructions or data structures stored thereon. Such tangible computer-readable storage media can be any available media that can be accessed by a general purpose or special purpose computer, including the functional design of any special purpose processor as described above. By way of example, and not limitation, such tangible computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply to languages, accents, handicaps, and other pronunciation variants. Various modifications and changes may be made to the principles described herein without following the example embodiments and applications illustrated and described herein, and without departing from the spirit and scope of the disclosure. Claim language reciting "at least one of" a set indicates one member of the set or multiple members of the set satisfy the claim.

We claim:

1. A method comprising:
generating, via a speech processing system and based on a location of a device, first speech comprising a first portion corresponding to at least a first part of a text and a second portion corresponding to at least a second part of the text, the first portion in a first language and the second portion in a second language;
communicating the first speech to the device;
generating, via the speech processing system, second speech from the text wherein the second speech comprises the first portion and the second portion both being in a same language; and
communicating the second speech to the device.

2. The method of claim 1, further comprising:
selecting, via the speech processing system, the first language for the first part of the text and the second language for the second part of the text.

3. The method of claim 1, wherein the generating the second speech from the text in which the second speech comprises the first portion and the second portion both being in the same language occurs when the device is at a second location.

4. The method of claim 3, wherein the location of the device differs from the second location.

5. The method of claim 1, wherein the first language is a primary language of a recipient and the second language is selected based on an original pronunciation of the second part of the text.

6. The method of claim 5, wherein the first part of the text is an address number and the second part of the text is a street name.

7. The method of claim 1, wherein the first language and the second language correspond to distinct regional accents of a single language.

8. The method of claim 1, wherein one of: the first language or the second language is selected based on at least one of: an age, an ethnicity, or a language of a sender of the text.

9. The method of claim 1, further comprising:
receiving, from a recipient, an input indicating a category corresponding to one of: the first part of the text or the second part of the text.

10. The method of claim 1, wherein the generating of the first speech occurs on a mobile device.

11. The method of claim 1, further comprising identifying the first portion and the second portion using a first language pronunciation database corresponding to the first language and a second language pronunciation database corresponding to the second language.

12. A speech processing system comprising:
a processor; and
a computer-readable storage medium having instructions stored which, when executed by the processor, cause the processor to perform operations, the operations comprising:
generating, based on a location of a device, first speech comprising a first portion corresponding to at least a first part of a text and a second portion corresponding to at least a second part of the text, the first portion in a first language and the second portion in a second language;
communicating the first speech to the device;
generating second speech from the text wherein the second speech comprises the first portion and the second portion both being in a same language; and
communicating the second speech to the device.

13. The speech processing system of claim 12, wherein the computer-readable storage medium stores additional instructions which, when executed by the processor, cause the processor to perform operations further comprising:
selecting, via the speech processing system, the first language for the first part of the text and the second language for the second part of the text.

14. The speech processing system of claim 12, wherein the generating the second speech from the text in which the second speech comprises the first portion and the second portion both being in the same language occurs when the device is at a second location.

15. The speech processing system of claim 12, wherein the first language is a primary language of a recipient and the second language is selected based on an original pronunciation of the second part of the text.

16. The speech processing system of claim 15, wherein the first part of the text is an address number and the second part of the text is a street name.

17. The speech processing system of claim 12, wherein the first language and the second language correspond to distinct regional accents of a single language.

18. The speech processing system of claim 12, wherein one of: the first language or the second language is selected based on at least one of: an age, an ethnicity, or a language of a sender of the text.

19. The speech processing system of claim 12, wherein the computer-readable storage medium stores additional instructions which, when executed by the processor, cause the processor to perform operations further comprising:
receiving, from a recipient, an input indicating a category corresponding to one of: the first part of the text or the second part of the text.

20. A computer-readable storage device having instructions stored which, when executed by a speech processing system, cause the speech processing system to perform operations, the operations comprising:
generating, based on a location of a device, first speech comprising a first portion corresponding to at least a first part of a text and a second portion corresponding to at least a second part of the text, the first portion in a first language and the second portion in a second language;
communicating the first speech to the device;
generating second speech from the text wherein the second speech comprises the first portion and the second portion both being in a same language; and
communicating the second speech to the device.

* * * * *